(12) United States Patent
Chen et al.

(10) Patent No.: US 10,979,707 B2
(45) Date of Patent: Apr. 13, 2021

(54) METHOD AND APPARATUS OF ADAPTIVE INTER PREDICTION IN VIDEO CODING

(71) Applicant: MEDIATEK INC., Hsin-Chu (TW)

(72) Inventors: Ching-Yeh Chen, Taipei (TW); Chih-Wei Hsu, Hsinchu (TW); Han Huang, Beijing (CN); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/757,694

(22) PCT Filed: Sep. 5, 2016

(86) PCT No.: PCT/CN2016/097996
§ 371 (c)(1),
(2) Date: Mar. 6, 2018

(87) PCT Pub. No.: WO2017/036417
PCT Pub. Date: Mar. 9, 2017

(65) Prior Publication Data
US 2019/0045183 A1  Feb. 7, 2019

(30) Foreign Application Priority Data
Sep. 6, 2015 (WO) ............... PCT/CN2015/088952

(51) Int. Cl.
*H04N 19/109* (2014.01)
*H04N 19/176* (2014.01)
(Continued)

(52) U.S. Cl.
CPC ......... *H04N 19/109* (2014.11); *H04N 19/117* (2014.11); *H04N 19/137* (2014.11);
(Continued)

(58) Field of Classification Search
CPC .. H04N 19/109; H04N 19/117; H04N 19/137; H04N 19/14; H04N 19/176; H04N 19/577; H04N 19/59; H04N 19/82
See application file for complete search history.

(56) References Cited

U.S. PATENT DOCUMENTS

| 8,155,208 B2 | 4/2012 | MacDonald Boyce |
| 9,888,252 B2 | 2/2018 | Chujoh et al. |

(Continued)

FOREIGN PATENT DOCUMENTS

| CN | 101631242 A | 1/2010 |
| CN | 101953167 A | 1/2011 |

(Continued)

OTHER PUBLICATIONS

Fujibayashi, et.al., "TE12: Performance of Partition Based Illumination Compensation (PBIC)" Joint Collaborative Team on Video Coding (JCT-VC) of ITU-T SG16 WP3 and ISO/IEC JTC1/SC29/WG11, Published on Oct. 7, 2010; pp. 1-12.

(Continued)

*Primary Examiner* — Francis Geroleo
(74) *Attorney, Agent, or Firm* — Oblon, McClelland, Maier & Neustadt, L.L.P.

(57) ABSTRACT

A method and apparatus of video coding using adaptive Inter prediction are disclosed. A selected Inter prediction process is determined, wherein the selected Inter prediction process selects an Inter prediction filter from multiple Inter prediction filters for the current block depending on first pixel data comprising neighbouring reconstructed pixels (NRP) of the current block. The selected Inter prediction process may be further determined depending on extra motion compensated pixels (EMCP) around a motion-compensated reference block corresponding to the current block. Distortion between the NRP and EMCP can be used to determine the selected Inter prediction filter. The distortion can be calcu- (Continued)

lated using a sum of absolute differences or squared differences between the NRP and the EMCP.

13 Claims, 3 Drawing Sheets

(51) Int. Cl.
| | |
|---|---|
| *H04N 19/117* | (2014.01) |
| *H04N 19/577* | (2014.01) |
| *H04N 19/59* | (2014.01) |
| *H04N 19/82* | (2014.01) |
| *H04N 19/14* | (2014.01) |
| *H04N 19/137* | (2014.01) |

(52) U.S. Cl.
CPC .......... *H04N 19/14* (2014.11); *H04N 19/176* (2014.11); *H04N 19/577* (2014.11); *H04N 19/59* (2014.11); *H04N 19/82* (2014.11)

(56) References Cited

U.S. PATENT DOCUMENTS

| | | | |
|---|---|---|---|
| 2004/0008786 A1* | 1/2004 | Boyce | H04N 19/196 375/240.24 |
| 2005/0259736 A1* | 11/2005 | Payson | H04N 19/176 375/240.16 |
| 2011/0103478 A1 | 5/2011 | Demos | |
| 2011/0261886 A1* | 10/2011 | Suzuki | H04N 19/103 375/240.16 |
| 2014/0003522 A1* | 1/2014 | Park | H04N 19/109 375/240.16 |

FOREIGN PATENT DOCUMENTS

| | | |
|---|---|---|
| CN | 103747269 A | 4/2014 |
| EP | 2 627 086 A1 | 8/2013 |
| JP | 2004007377 A | 1/2004 |
| JP | 2005533467 A | 11/2005 |
| WO | 2010/049917 A2 | 5/2010 |

OTHER PUBLICATIONS

Yin, Tourapis, and Boyce, "Localized Weighted Prediction for Video Coding;" Corporate Research Princeton, Thomson Inc.; Published on May, 2005 in Princeton, NJ, USA; pp. 1-4.

Han, J.K., Seo, C.W., and Lim, J., "Pixel Based Illumination Compensation;" Joint Collaborative Team on Video Coding (JCT-VC) of ITU-T SG16 WP3 and ISO/IEC JTC1/SC29/WG11, Published on Jul. 14, 2011; pp. 1-10.

Byeongmoon, J. et.al., "Description of video coding technology proposal by LG Electronics;" Joint Collaborative Team on Video Coding (JCT-VC) of ITU-T SG16 WP3 and ISO/IEC JTC1/SC29/WG11, Published on Apr. 15, 2010 in Seoul, Korea; pp. 1-35.

Bordes, P., et al.; "Improvement of Implicit Weighted Prediction;" Joint Collaborative Team on Video Coding (JCT-VC) of ITU-T SG 16 WP 3 and ISO/IEC JTC 1/SC 29/WG 11; Apr.-May 2012; pp. 1-10.

Lee, C.L., et al.; "Bi-prediction combining template and block motion compensations;" Joint Collaborative Team on Video Coding (JCT-VC) of ITU-T SG 16 WP 3 and ISO/IEC JTC1/SC29/WG11; Jan. 2011; pp. 1-7.

International Search Report dated Nov. 30, 2016, issued in application No. PCT/CN2016/097996.

* cited by examiner

METHOD AND APPARATUS OF ADAPTIVE INTER PREDICTION IN VIDEO CODING

CROSS REFERENCE TO RELATED APPLICATIONS

The present invention claims priority to PCT Patent Application, Serial No. PCT/CN2015/088952, filed on Sep. 6, 2015. The PCT Patent Application is hereby incorporated by reference in its entirety.

TECHNICAL FIELD

The present invention relates to video coding of video data. In particular, the present invention relates to adaptive Inter prediction in video coding to improve coding efficiency.

BACKGROUND

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the emerging HEVC (High Efficiency Video Coding) standard.

FIG. 1 illustrates an exemplary adaptive Inter/Intra video coding system incorporating loop processing. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data are stored in Reference Picture Buffer 134 and used for prediction of other frames. However, loop filter 130 (e.g. deblocking filter and/or sample adaptive offset, SAO) may be applied to the reconstructed video data before the video data are stored in the reference picture buffer.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. Each CU is a 2N×2N square block and can be recursively split into four smaller CUs until the predefined minimum size is reached. Once the splitting of CU hierarchical tree is done, each leaf CU is further split into one or more prediction units (PUs) according to prediction type and PU partition. Furthermore, the basic unit for transform coding is square size named Transform Unit (TU).

In HEVC, Intra and Inter predictions are applied to each block (i.e., PU). Intra prediction modes use the spatial neighbouring reconstructed pixels to generate the directional predictors. On the other hand, Inter prediction modes use the temporal reconstructed reference frames to generate motion compensated predictors. The prediction residuals are coded using transform, quantization and entropy coding. More accurate predictors will lead to smaller prediction residual, which in turn will lead to less compressed data (i.e., higher compression ratio).

Inter predictions will explore the correlations of pixels between frames and will be efficient if the scene are stationary or the motion is translational. In such case, motion estimation can easily find similar blocks with similar pixel values in the temporal neighbouring frames. For Inter prediction in HEVC, the Inter prediction can be uni-prediction or bi-prediction. For uni-prediction, a current block is predicted by one reference block in a previous coded picture. For bi-prediction, a current block is predicted by two reference blocks in two previous coded pictures. The prediction from two reference blocks is averaged to form a final predictor for bi-prediction.

In many video coding standards, fractional motion vectors are also supported. For example, in the HEVC standard, the fractional motion compensation is implemented using a pre-defined 8-tap interpolation filter for the luma component and a pre-defined 4-tap interpolation filter for the chroma component, respectively. However, the process of Inter prediction in HEVC is fixed. For example, weighting factors (i.e., 0.5 and 0.5) in bi-directional prediction or filter coefficients in fractional motion compensation are fixed. Therefore, the conventional Inter prediction cannot adapt to the local characteristics of blocks well. Therefore, in order to further improve the compression efficiency of Inter prediction, it is desirable to develop adaptive Inter prediction method.

SUMMARY

A method and apparatus of video coding using adaptive Inter prediction are disclosed. According to the present invention, a selected Inter prediction process is determined, wherein the selected Inter prediction process selects an Inter prediction filter from multiple Inter prediction filters for the current block depending on first pixel data comprising neighbouring reconstructed pixels of the current block. The current block is then encoded or decoded using the selected Inter prediction process. The first pixel data may further comprise extra motion compensated pixels around a motion-compensated reference block corresponding to the current block. Distortion between the neighbouring reconstructed pixels of the current block and the extra motion compensated pixels around the motion-compensated reference block can be used to determine the Inter prediction filter. The distortion can be calculated using a sum of absolute differences or squared differences between the neighbouring reconstructed pixels of the current block and the extra motion compensated pixels around the motion-compensated reference block. The first pixel data areselected based on motion information of the current block and motion information of neighbouring reconstructed pixels of the current block. The neighbouring reconstructed pixels of the current block may comprise one or more rows or columns of neighbouring pixels above top boundary of the current block. The neighbouring reconstructed pixels of the current block may be selected using subsampling.

In one embodiment, the multiple Inter prediction filters have different number of filter taps, different filter coefficients, or both. The selected Inter prediction process is determined by selection among a group of Inter prediction processes comprising an Inter prediction process supporting the multiple Inter prediction filters, an Inter prediction process supporting multiple sets of weighting factors for bi-directional prediction, or an Inter prediction process supporting both the multiple Inter prediction filters and multiple sets of weighting factors. Information associated with the group of Inter prediction processes can be signalled at a sequence level, picture level, or slice level of video bitstream. The group of Inter prediction processes can be determined according to slice type, prediction mode, or motion information. Information of the selected Inter prediction process can be signalled explicitly from an encoder to a decoder. Whether to use the selected Inter prediction process is enabled or disabled can be signalled at a sequence level, picture level, slice level, coding unit level, or prediction unit level of video bitstream.

In another embodiment, a selected Inter prediction process is determined, in which the selected Inter prediction process selects a set of weighting factors from multiple sets of weighting factors for the current block for bi-directional prediction, and then the current block is encoded or decoded using the selected Inter prediction process. The multiple sets of weighting factors comprise [0.5, 0.5], [0.25, 0.75], [0.75, 0.25], [0.375, 0.625], and [0.625, 0.375]. For the case of multiple sets of weighting factors, distortion between neighbouring reconstructed pixels of the current block and extra motion compensated pixels around a motion-compensated reference block corresponding to the current block is used to determine the set of weighting factors. The first predictor associated with first motion information and second predictor associated with second motion information are derived only once for each pixel of the neighbouring reconstructed pixels of the current block. A sum and a difference associated with the first predictor and the second predictor are determined for each pixel of the neighbouring reconstructed pixels of the current block. Afterward, distortions associated with the weighting factors, [0.5, 0.5], [0.625, 0.375], [0.375, 0.625], [0.75, 0.25], and [0.25, 0.75] are calculated as $D0=(X<<3)-Q$, $D1=D0-R$, $D2=D0+R$, $D3=D1-R$, and $D4=D2+R$ respectively, where X denotes a reconstructed value of the neighbouring reconstructed pixels of the current block.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the conventional Inter prediction is rather static and cannot adapt to local characteristics in the underlying video. Accordingly, in one embodiment of the present invention, the correlation between a current block and neighbouring reconstructed pixels are utilized to achieve the local adaptation of Inter prediction. The method is referred as Adaptive Inter Prediction.

In one embodiment, more than one Inter prediction processes can be used and neighbouring reconstructed pixels around a current block are used for the selected Inter prediction process to select an Inter prediction method corresponding to an interpolation filter and/or a set of weighting factors for the current block. The more than one Inter prediction processes may correspond to an Inter prediction process supporting different interpolation filters (also referred to as the Inter prediction filters) and/or an Inter prediction process supporting different sets of weighting factors for bi-directional prediction. The different interpolation filters may correspond to different number of filter taps and/or different filter coefficients.

In one embodiment, the selection among different Inter prediction filters can be dependent on neighbouring reconstructed pixels (NRP) around the current block. The selection among different Inter prediction filters may also be dependent on the extra motion compensated pixels for neighbouring reconstructed pixels around the current block. The neighbouring reconstructed pixels can be selected base on motion information of the current block and neighbouring reconstructed pixels. For example, based on the motion comparison between the motion information of the current block and the neighbouring reconstructed pixels, only the neighbouring reconstructed pixels at left boundary of current block are selected to determine the inter prediction filter from multiple filters if the motion information of current block is the same as those of left CU but different to those of above CU. In the foregoing embodiment, the selection among different Inter prediction filters is implicitly derived. However, in another embodiment, the selection among different Inter prediction filters can be explicitly signalled.

Figure 1:
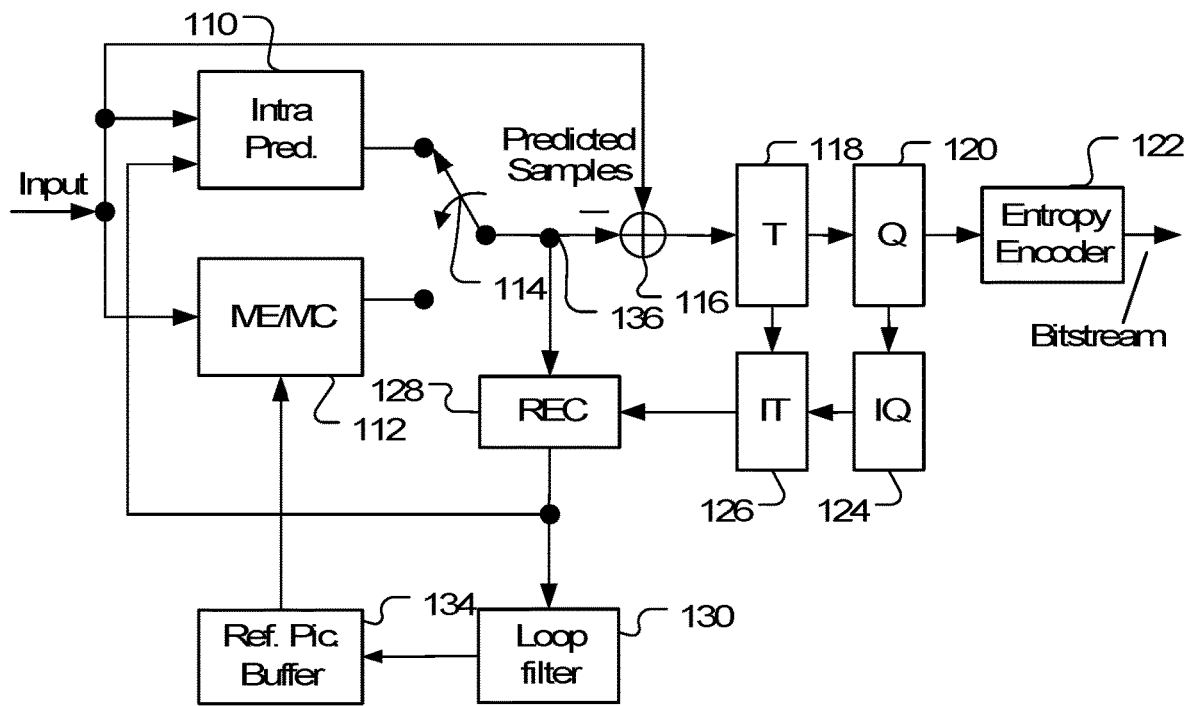
FIG. 1 illustrates an exemplary adaptive Inter/Intra video encoding system using transform, quantization and loop processing.
Figure 2:
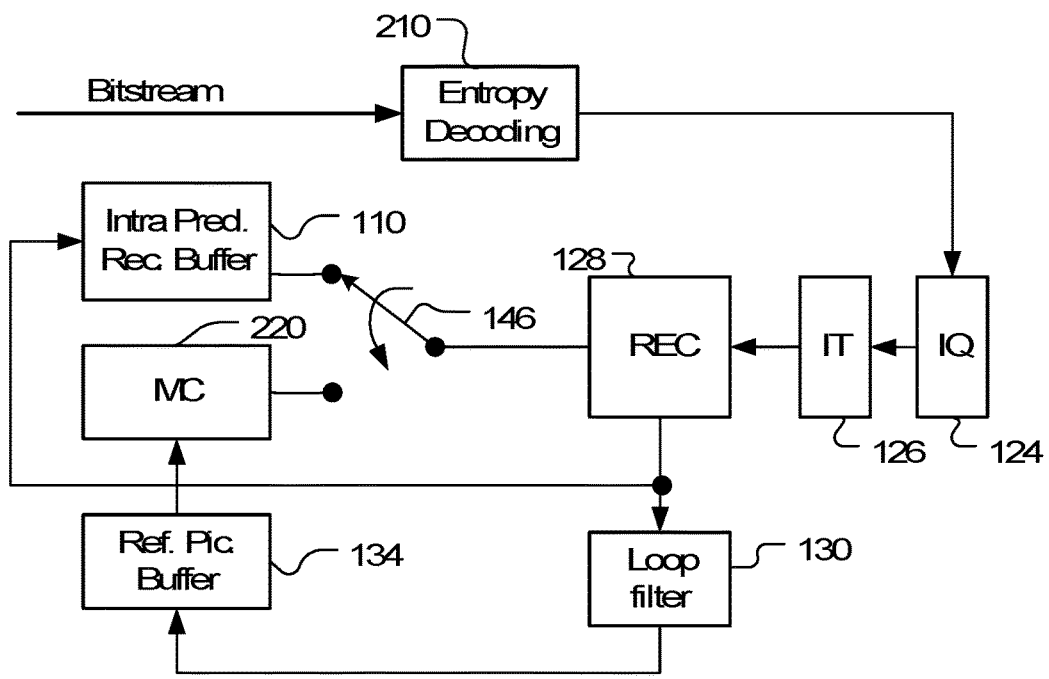
FIG. 2 illustrates an exemplary adaptive Inter/Intra video decoding system using transform, quantization and loop processing.
Figure 3:
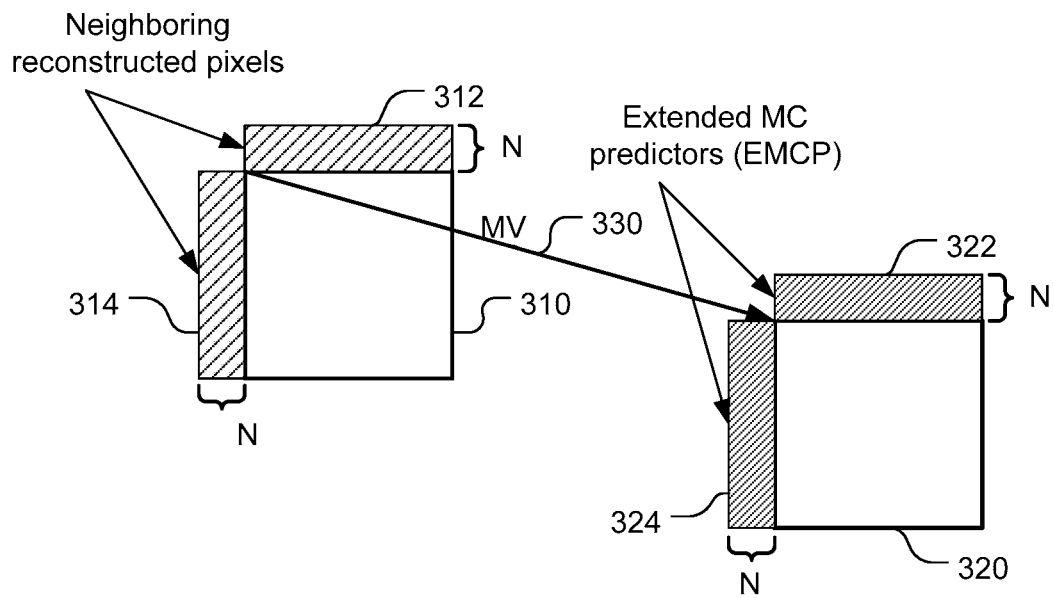
FIG. 3 illustrates an example of adaptive Inter prediction by selecting an Inter prediction method by a selected Inter prediction process based on distortion between neighbouring reconstructed pixels of the current block and extended motion compensated pixels of a motion-compensated reference block corresponding to the current block according to one embodiment of the present invention.

FIG. 3 illustrates an example of selecting an Inter prediction method by a selected Inter prediction process according to one embodiment of the present invention. In FIG. 3, the neighbouring reconstructed pixels (NRP) comprise N above neighbouring rows 312 above the top boundary of the current block 310 and N left neighbouring columns (i.e., vertical lines) 314 to the left of the left boundary of the current block 310. In one example, the neighbouring reconstructed pixels of the current block 310 are selected using subsampling. The extended motion compensated predictors or pixels (EMCP) comprise N above neighbouring rows 322 above the top boundary of the motion-compensated reference block 320 and N left neighbouring columns (i.e., vertical lines) 324 to the left of the left boundary of the motion-compensated reference block 320. The motion-compensated reference block 320 is identified according to the location of the current block 310 and the motion vector 330. The motion vector may have integer accuracy or fractional-pel resolution. Accordingly, either integer motion compensation or fractional motion compensation can be used.

Compared to conventional Inter prediction, the above embodiment requires performing additional motion compensation associated with the NRP and EMCP in order to select one Inter prediction method among multiple candidates.

N is an integer equal to 1 or larger. The NRP and EMCP configuration shown in FIG. 3 are intended to illustrate an example according to an embodiment and shall be construed as limitations to the present invention. For example, the number of above neighbouring lines may be different from the number of left neighbouring lines.

Figure 4:
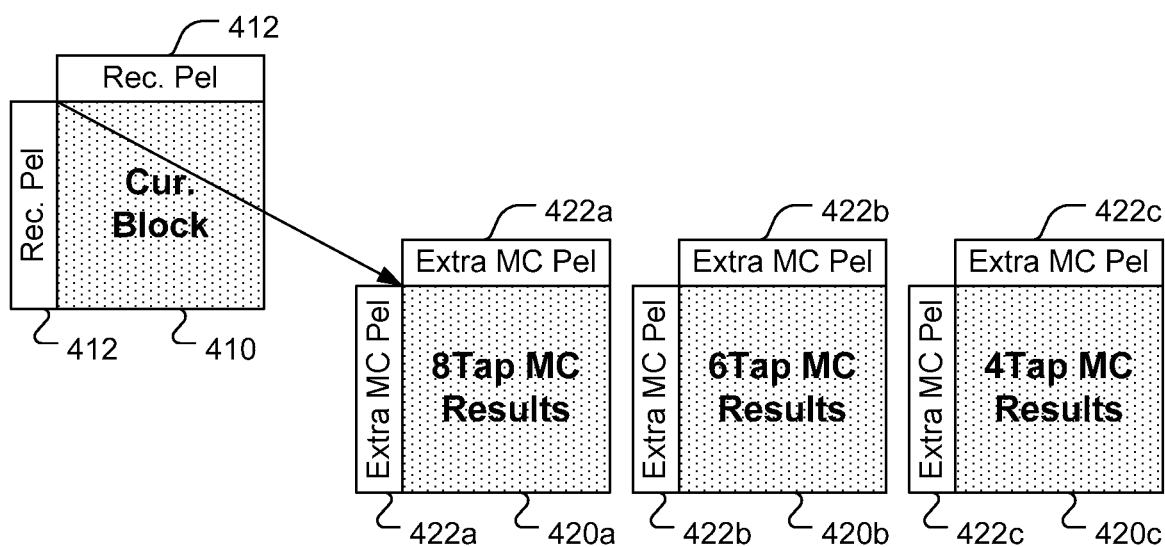
FIG. 4 illustrates an example of adaptive Inter prediction by selecting an interpolation filter among three candidates by a selected Inter prediction process based on distortion between neighbouring reconstructed pixels of the current block and extended motion compensated pixels of a motion-compensated reference block corresponding to the current block according to one embodiment of the present invention.

FIG. 4 illustrates an example of adaptive Inter prediction process according to an embodiment of the present invention. In this example, three kinds of interpolation filters can be used in a video coding system. The adaptive Inter prediction process may begin with performing motion compensation using these three interpolation filters for neighbouring reconstructed pixels (412) around the current block (410) to generate extra motion compensated pixels (422a, 422b, 422c) around the motion-compensated reference block (420a, 420b, 420c), as shown in FIG. 4. Distortions between neighbouring reconstructed pixels (412) and extra motion compensated pixels (422a, 422b, 422c) are then calculated for these three kinds of interpolation filters. The interpolation filter with the smallest distortion is used to generate the predictor of current block. For uni-directional prediction, adaptive Inter prediction can be achieved by adaptively selecting one filter from different interpolation filters. As mentioned above, integer motion compensation or fractional motion compensation can be used.

In another embodiment, for bi-directional prediction, adaptive Inter prediction can be implemented by supporting different sets of weighting factors, such as [0.5, 0.5], [0.25, 0.75], [0.75, 0.25], [0.375, 0.625], or [0.625, 0.375] between two predictors. In this embodiment, one set of weighting factors is selected depending on the neighbouring reconstructed pixels of the current block and/or the extra motion compensated pixels around a motion-compensated reference block corresponding to the current block. For example, according to the distortion between the neighbouring reconstructed pixels and the extra motion compensated pixels, one set of weighting factors is selected for encoding or decoding the current block. However, in the conventional bi-directional prediction, the weighting factors [0.5, 0.5] are always used.

In another embodiment, different weighting factors for the two predictors as different interpolation filters can also be used in bi-directional prediction.

In yet another embodiment, different Inter prediction methods can be combined to form another Inter prediction method. For example, different sets of weighting factors can be combined with variant interpolation filters, so that each unique combination of a particular set of weighting factors and a particular interpolation filter is an Inter prediction method. The selection of an Inter prediction process from supported sets of weighting factors and supported interpolation filters depends on the neighbouring reconstructed pixels of the current block and/or the extra motion compensated pixels around a motion-compensated reference block corresponding to the current block.

In still yet another embodiment, the distortion between neighbouring reconstructed pixels and extra motion compensated pixels can be measured as the sum of absolute differences, sum of squared errors, and so on.

In still yet another embodiment, for the bi-directional prediction with adaptive weighting factors, efficient distortion calculations for a set of candidate weighting factors are disclosed. Again, additional motion compensation needs to be performed for the neighbouring reconstructed pixels, where X denotes a reconstructed value of the neighbouring reconstructed pixels:

1) Perform motion compensation and get predictors P0 and P1 for pixels of the neighbouring reconstructed pixels associated with two corresponding motion vectors.
2) $Q=(P0+P1)<<2$
3) $R=P0-P1$
4) The distortion for weighting factor [0.5, 0.5] is calculated as $D0=(X<<3)-Q$.
5) The distortion for weighting factor [0.625, 0.375] is calculated as $D1=D0-R$
6) The distortion for weighting factor [0.375, 0.625] is calculated as $D2=D0+R$
7) The distortion for weighting factor [0.75, 0.25] is calculated as $D3=D1-R$
8) The distortion for weighting factor [0.25, 0.75] is calculated as $D4=D2+R$ The expression in the above illustration uses simplified notations for P0, P1, Q and R, where the indices for pixel locations in the neighbouring reconstructed pixels are dropped. The distortions D0 through D4 are calculated as the sum of distortions of individual pixels in the neighbouring reconstructed pixels. As shown above, only one motion compensation is performed for each neighbouring reconstructed pixel as in step 1, then the distortions of all sets of candidate weighting factors can be derived as in the following steps. To be specific, a variable Q related to the sum of the two predictors is calculated in step 2. Furthermore, a variable R related to the difference of the two predictors is calculated in step 3. The distortions associated with various sets of weighting factors can be efficiently calculated based on Q, R and/or a previously calculated distortion for another set of weighting factors.

In still another embodiment, the selection of supported adaptive Inter prediction processes among different adaptive Inter prediction processes can be signalled at sequence level, picture level or slice level. The selection of supported adaptive Inter prediction processes can be dependent on the slice type, prediction mode, or motion information. Furthermore, whether to enable the adaptive Inter prediction can be signalled at sequence level, picture level, slice level, coding unit level, or prediction unit level.

In still another embodiment, the selection of bi-directional prediction with adaptive weighting factors can be explicitly signalled to the decoder at sequence level, picture level, slice level, coding unit level, or prediction unit level.

Figure 5:
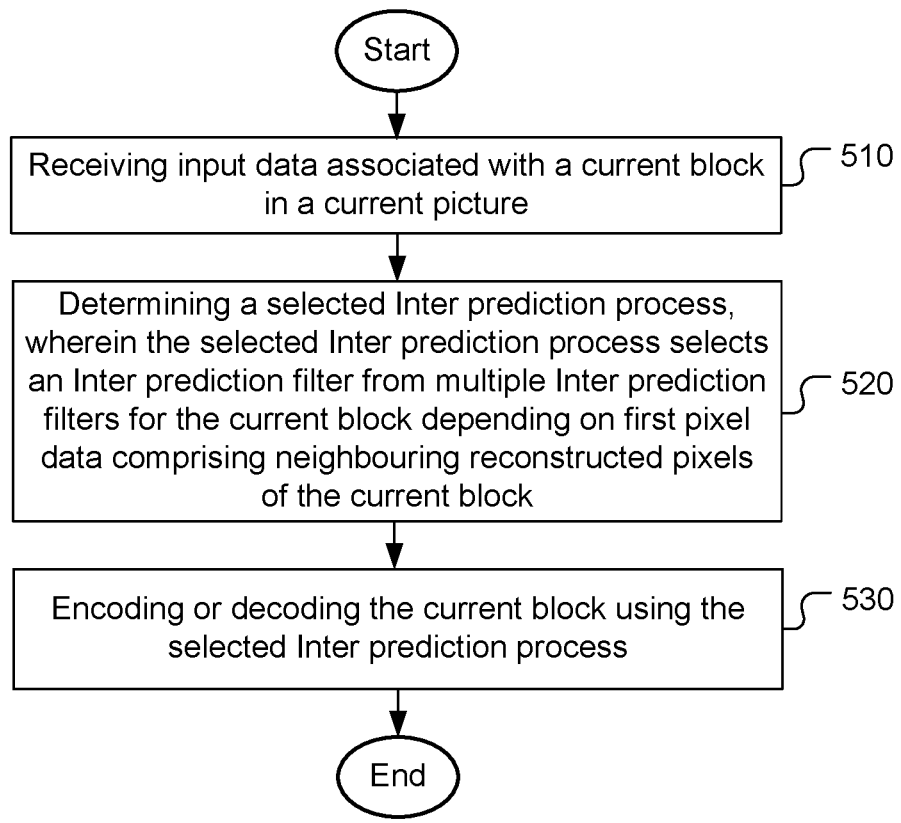
FIG. 5 illustrates an exemplary flowchart for a video coding system utilizing adaptive Inter prediction according to an embodiment of the present invention.

FIG. 5 illustrates an exemplary flowchart for a video coding system utilizing adaptive Inter prediction according to an embodiment of the present invention. In the encoder side, the input data may correspond to the pixel data to be encoded. In the decoder side, the input data may correspond to the coded data including the current block and other associated data. According to this method, input data associated with a current block in a current picture is received in step 510.

A selected Inter prediction process is determined, in which the selected Inter prediction process selects an Inter prediction filter from multiple Inter prediction filters for the current block depending on first pixel data comprising neighbouring reconstructed pixels of the current block in step 520. The current block is encoded or decoded using the selected Inter prediction process in step 530.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention.

The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter prediction for video coding, the method comprising:
receiving input data associated with a current block in a current picture;
identifying first motion information and second motion information for generating predicted samples of the current block according to bi-directional prediction, a first predictor being determined according to the first motion information, and a second predictor being determined according to the second motion information;
determining candidate sets of weighting factors from available sets of weighting factors according to a slice type, a prediction mode, or motion information for the current block;
determining distortion values associated with the candidate sets of weighting factors;
determining a selected set of weighting factors from the candidate sets of weighting factors for the current block for the bi-directional prediction according to the distortion values associated with the candidate sets of weighting factors;
generating the predicted samples of the current block according to the first predictor, the second predictor, and the selected set of weighting factors; and
encoding or decoding the current block according to the predicted samples of the current block, wherein
the candidate sets of weighting factors includes a set of weighting factors of [0.5, 0.5], and
the determining the distortion values comprises:
determining a distortion value D0 associated with the set of weighting factors of [0.5, 0.5] according to a first neighboring reconstructed region of the first predictor, a second neighboring reconstructed region of the second predictor, and a current neighboring reconstructed region of the current block;
determining a difference R of pixels between the first neighboring reconstructed region of the first predictor and the second neighboring reconstructed region of the second predictor; and
determining other one or more of the distortion values associated with one or more other sets of the candidate sets of weighting factors according to D0 and R.

2. The method of claim 1, wherein the candidate sets of weighting factors comprise [0.5, 0.5], [0.25, 0.75], [0.75, 0.25], [0.375, 0.625], and [0.625, 0.375].

3. The method of claim 2, wherein each one of the distortion values being determined as a sum of distortion values for individual pixel locations of the current neighboring reconstructed region of the current block.

4. The method of claim 3, wherein
the distortion values D0, D1, D2, D3, and D4 for a particular pixel location of the current neighboring reconstructed region of the current block associated with the respective weighting factors [0.5, 0.5], [0.625, 0.375], [0.375, 0.625], [0.75, 0.25], and [0.25, 0.75] are calculated according to $$D0=(X<<3)-Q,$$

$$D1=D0-R,$$

$$D2=D0+R,$$

$$D3=D1-R,$$

$$D4=D2+R,$$

$$Q=(P0+P1)<<2, \text{ and}$$

$$R=P0-P1,$$

P0 denotes a first predicted value derived from the first neighboring reconstructed region corresponding to the particular pixel location of the current neighboring reconstructed region,
P1 denotes a second predicted value derived from the second neighboring reconstructed region corresponding to the particular pixel location of the current neighboring reconstructed region, and
X denotes a reconstructed value for the particular pixel location of the current neighboring reconstructed region.

5. The method of claim 1, wherein a selection from the candidate sets of weighting factors is explicitly signaled at a sequence level, picture level, slice level, coding unit level, or prediction unit level of a video bitstream.

6. The method of claim 1, wherein whether a functionality of determining the selected set of weighting factors is enabled or disabled is signaled at a sequence level, picture level, slice level, coding unit level, or prediction unit level of a video bitstream.

7. An apparatus for Inter prediction in video coding, the apparatus comprising one or more electronic circuits or processors configured to:
receive input data associated with a current block in a current picture;
identify first motion information and second motion information for generating predicted samples of the current block according to bi-directional prediction, a first predictor being determined according to the first motion information, and a second predictor being determined according to the second motion information;
determine candidate sets of weighting factors from available sets of weighting factors according to a slice type, a prediction mode, or motion information for the current block;
determine distortion values associated with the candidate sets of weighting factors;
determine a selected set of weighting factors from the candidate sets of weighting factors for the current block for the bi-directional prediction according to the distortion values associated with the candidate sets of weighting factors;
generate the predicted samples of the current block according to the first predictor, the second predictor, and the selected set of weighting factors; and
encode or decode the current block according to the predicted samples of the current block, wherein
the candidate sets of weighting factors includes a set of weighting factors of [0.5, 0.5], and
the one or more electronic circuits or processors are further configured to:
determine a distortion value D0 associated with the set of weighting factors of [0.5, 0.5] according to a first neighboring reconstructed region of the first predictor, a second neighboring reconstructed region of the second predictor, and a current neighboring reconstructed region of the current block;
determine a difference R of pixels between the first neighboring reconstructed region of the first predictor and the second neighboring reconstructed region of the second predictor; and
determine other one or more of the distortion values associated with one or more other sets of the candidate sets of weighting factors according to D0 and R.

8. The apparatus of claim 7, wherein the candidate sets of weighting factors comprise [0.5, 0.5], [0.25, 0.75], [0.75, 0.25], [0.375, 0.625], and [0.625, 0.375].

9. The apparatus of claim 8, wherein the one or more electronic circuits or processors are configured to determine each one of the distortion values as a sum of distortion values for individual pixel locations of the current neighboring reconstructed region of the current block.

10. The apparatus of claim 9, wherein
the distortion values D0, D1, D2, D3, and D4 for a particular pixel location of the current neighboring reconstructed region of the current block associated with the respective weighting factors [0.5, 0.5], [0.625, 0.375], [0.375, 0.625], [0.75, 0.25], and [0.25, 0.75] are calculated according to $$D0=(X<<3)-Q,$$

$$D1=D0-R,$$

$$D2=D0+R,$$

$$D3=D1-R,$$

$$D4=D2+R,$$

$$Q=(P0+P1)<<2, \text{ and}$$

$$R=P0-P1,$$

P0 denotes a first predicted value derived from the first neighboring reconstructed region corresponding to the particular pixel location of the current neighboring reconstructed region,
P1 denotes a second predicted value derived from the second neighboring reconstructed region corresponding to the particular pixel location of the current neighboring reconstructed region, and
X denotes a reconstructed value for the particular pixel location of the current neighboring reconstructed region.

11. The apparatus of claim 7, wherein a selection from the candidate sets of weighting factors is explicitly signaled at a sequence level, picture level, slice level, coding unit level, or prediction unit level of a video bitstream.

12. The apparatus of claim 7, wherein a functionality of whether determining the selected set of weighting factors is enabled or disabled is signaled at a sequence level, picture level, slice level, coding unit level, or prediction unit level of a video bitstream.

13. A non-transitory computer-readable medium storing program codes that, when executed by a processor, cause the processor to perform a method that comprises:

receiving input data associated with a current block in a current picture;

identifying first motion information and second motion information for generating predicted samples of the current block according to bi-directional prediction, a first predictor being determined according to the first motion information, and a second predictor being determined according to the second motion information;

determining candidate sets of weighting factors from available sets of weighting factors according to a slice type, a prediction mode, or motion information for the current block;

determining distortion values associated with the candidate sets of weighting factors, respectively;

determining a selected set of weighting factors from the candidate sets of weighting factors for the current block for the bi-directional prediction according to the distortion values associated with the candidate sets of weighting factors;

generating the predicted samples of the current block according to the first predictor, the second predictor, and the selected set of weighting factors; and encoding or decoding the current block according to the predicted samples of the current block, wherein the candidate sets of weighting factors includes a set of weighting factors of [0.5, 0.5], and the determining the distortion values comprises:

determining a distortion value D0 associated with the set of weighting factors of [0.5, 0.5] according to a first neighboring reconstructed region of the first predictor, a second neighboring reconstructed region of the second predictor, and a current neighboring reconstructed region of the current block;

determining a difference R of pixels between the first neighboring reconstructed region of the first predictor and the second neighboring reconstructed region of the second predictor; and determining other one or more of the distortion values associated with one or more other sets of the candidate sets of weighting factors according to D0 and R.

* * * * *